(12) United States Patent
Johnson

(10) Patent No.: US 10,666,768 B1
(45) Date of Patent: May 26, 2020

(54) AUGMENTED HOME NETWORK VISUALIZATION

(71) Applicant: Alarm.com Incoporated, Tysons, VA (US)

(72) Inventor: Kyle Rankin Johnson, Arlington, VA (US)

(73) Assignee: Alarm.com Incorporated, Tysons, VA (US)

(*) Notice: Subject to any disclaimer, the term of this patent is extended or adjusted under 35 U.S.C. 154(b) by 30 days.

(21) Appl. No.: 15/708,311

(22) Filed: Sep. 19, 2017

Related U.S. Application Data

(60) Provisional application No. 62/396,973, filed on Sep. 20, 2016.

(51) Int. Cl.
| | | |
|---|---|---|
| *G06T 11/00* | (2006.01) | |
| *H04L 29/08* | (2006.01) | |
| *H04W 24/08* | (2009.01) | |
| *H04B 17/318* | (2015.01) | |
| *G06K 9/00* | (2006.01) | |
| *H04W 84/12* | (2009.01) | |
| *H04L 12/26* | (2006.01) | |
| *H04W 64/00* | (2009.01) | |

(52) U.S. Cl.
CPC .............. *H04L 67/36* (2013.01); *G06T 11/00* (2013.01); *H04W 24/08* (2013.01); *G06K 9/00671* (2013.01); *H04B 17/318* (2015.01); *H04L 43/045* (2013.01); *H04L 43/16* (2013.01); *H04W 64/006* (2013.01); *H04W 84/12* (2013.01)

(58) Field of Classification Search
CPC ................................. H04L 67/36; G06T 11/00
USPC ........................................................ 345/633
See application file for complete search history.

(56) References Cited

U.S. PATENT DOCUMENTS

| | | | | |
|---|---|---|---|---|
| 7,787,992 | B2 * | 8/2010 | Pretlove | ................... G06F 3/011 700/259 |
| 2008/0194265 | A1 * | 8/2008 | Engstrom | ............. H04W 16/18 455/446 |
| 2013/0057903 | A1 * | 3/2013 | Yamazaki | ............. G06F 3/1204 358/1.15 |
| 2014/0111542 | A1 * | 4/2014 | Wan | ................... G06F 17/30253 345/633 |
| 2015/0029220 | A1 * | 1/2015 | Hittel | .................... G06T 19/006 345/633 |

\* cited by examiner

*Primary Examiner* — Hai Tao Sun
(74) *Attorney, Agent, or Firm* — Fish & Richardson P.C.

(57) ABSTRACT

In some implementations, techniques are described for generating and displaying visualizations that display information for an electronic device in a visual interface presented to a user by an augmented reality (AR) device. Video data collected by an augmented reality device is obtained. A device of a property is identified based on the video data. In response to identifying the device, a network status for the device is obtained. One or more visualizations representing the network status for the device are generated. The one or more visualizations are provided for display to a user by the augmented reality device.

19 Claims, 6 Drawing Sheets

400

┌─────────────────────────────────────────────────────────────────────┐
│ OBTAIN DATA INDICATING A CURRENT FIELD OF VIEW OF AN AUGMENTED      │
│ REALITY DEVICE                                                  410 │
└─────────────────────────────────────────────────────────────────────┘
                                    ↓
┌─────────────────────────────────────────────────────────────────────┐
│ OBTAIN DATA INDICATING LOCATIONS OF ONE OR MORE DEVICES WITHIN      │
│ THE CURRENT FIELD OF VIEW                                       420 │
└─────────────────────────────────────────────────────────────────────┘
                                    ↓
┌─────────────────────────────────────────────────────────────────────┐
│ IN RESPONSE, OBTAIN NETWORK CONNECTIVITY DATA ASSOCIATED WITH       │
│ THE ONE OR MORE DEVICES                                         430 │
└─────────────────────────────────────────────────────────────────────┘
                                    ↓
┌─────────────────────────────────────────────────────────────────────┐
│ GENERATE ONE OR MORE VISUALIZATION REPRESENTING THE NETWORK         │
│ CONNECTIVITY DATA FOR OUTPUT WITHIN THE CURRENT FIELD OF VIEW       │
│                                                                 440 │
└─────────────────────────────────────────────────────────────────────┘

FIG. 4

AUGMENTED HOME NETWORK VISUALIZATION

CROSS-REFERENCE TO RELATED APPLICATION

This application claims the benefit of U.S. Provisional Patent Application No. 62/396,973 filed on Sep. 20, 2016 and entitled "AUGMENTED HOME NETWORK VISUALIZATION," which is incorporated herein by reference in its entirety.

TECHNICAL FIELD

This disclosure application relates generally to monitoring systems, and more particularly, to augmented reality.

BACKGROUND

A monitoring system for a property can include various components including sensors, cameras, and other devices. A user can configure the monitoring system by placing components in certain locations of the property. For instance, placement of components within certain locations can be used to improve network connectivity.

SUMMARY

In general, techniques are described for generating and displaying visualizations that display information for an electronic device in a visual interface presented to a user by an augmented reality (AR) device. For example, to generate the visualizations, a system initially obtains video data collected by a camera of the AR device. The system uses object recognition techniques to identify the connected device within a field of view of the obtained video data. The system obtains monitored data for the connected device, e.g., network connectivity data. The system generates visualizations for displaying the monitored data. The system then provides the virtualizations for display by the AR device.

The AR device displays visualizations through the visual interface presented to the user. The visual interface can be presented, for example, on a screen of a computing device or through a projection provided through a lens of a device, e.g., an optical head-mounted display. In this regard, the user can use the visual interface to view, for example, a video feed including a connected device and visualizations for monitored data.

The visual interface can be augmented to include visualizations to allow a user to perceive information, e.g., network connectivity information, for a connected device. The visualizations can be used to assist a user in finding a location for the connected device during an installation and/or a maintenance operation.

As an example, a user may use an AR device to view visualizations that include information related to a real-time measured network signal strength of a device. The visualizations may be displayed within a field of view of the AR device in relation to a present location of the connected device. In this regard, the visualizations can be used to allow a user to determine an appropriate physical location within a property to place the device to have a satisfactory network signal strength.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings.

DESCRIPTION OF DRAWINGS

FIG. 4 illustrates an example of a process for generating network connectivity visualizations for display on an augmented reality heads-up display.

In the drawings, like reference numbers represent corresponding parts throughout.

DETAILED DESCRIPTION

Figure 1A:
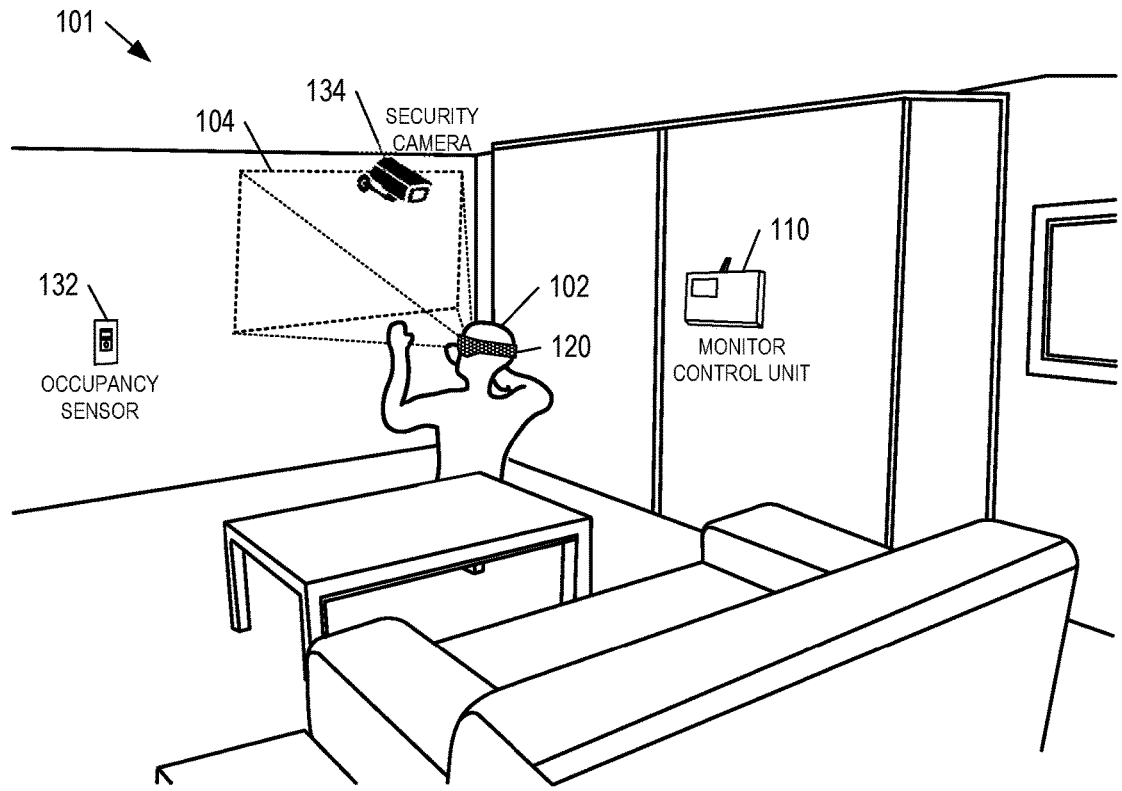
FIG. 1A illustrates an example of using an augmented reality device to assist in the installation and configuration of various devices within a property.

In general, techniques are described for generating and displaying visualizations that display information for a connected device in a visual interface presented to a user. The visual interface can be presented, for example, on a screen of a computing device, or through a projection provided through a lens of a device, e.g., an optical head-mounted display. A user can use the visual interface to view a video feed collected by a camera of the AR device.

As described herein, a "visual interface" refers to a field of view provided to a user by an augmented reality device for presenting information to a user. For example, a visual interface can be provided on a device screen of a smartphone. In this example, the visual interface depicts a field of view of a video feed captured by the smartphone's camera. In another example, the visual interface is provided as a projected display through a lens of head-mounted device. In this example, the visual interface depicts a field of view that a user perceives is in front of him/her by looking through the lens of the head-mounted device.

As discussed below, the visual interface can depict visualizations that are inserted into a visual interface on top of a video feed and/or into a video feed directly, to "augment" a video feed collected by an AR device. This provides the impression that the visualizations are placed in the physical environment of objects that are within, for instance, a field of view of the video feed. For example, a virtualization of a graphical overlay can be inserted to a visual interface presented on a smartphone screen such that a user perceives the graphical overlay as being included in the video feed collected by the smartphone's camera.

As described herein, a "virtualization" may refer to any digitally generated element that is inserted into a video feed collected by an AR device. Once inserted, the video feed is "augmented" such that, when the augmented video feed is provided to a user, the user perceives the virtualization through a visual interface as being placed in a physical environment captured within the video feed. In some implementations, the video feed can be augmented such that a visualization appears at specified location within the field of view that corresponds to a location of an identified object.

The visualizations may include renderings of various graphical and textual information to represent monitored data. For instance, the visualizations may include colors corresponding to ranges of a measured or sensed values for a connected device. In other instances, the visualizations may include text within a heads-up display that represent the measured or sensed values. In addition, the visualizations may be updated with adjustments to either the field of view of the user in relation to the location of the connected device, or the movement of the connected device in relation to the field of view of the user. For example, if a connected device is moved from an initial location to an updated location, then the visualizations may be updated to reflect the measured or sensed values corresponding to each location. In some instances, the updates to the visualization are performed in real-time where changes to measured or sensed values corresponding to changes in the movement path of the connected device can also be displayed.

The techniques described herein may enable the user to easily configure one or more connected device without using trial and error to determine if a certain placement location provides a satisfactory configuration. For instance, configuration information may be represented within the augmented field of view so that the user does not need to periodically check if a device is operational or functional. Since the user is able to visualize both the placement and the configuration information of the device within his/her field of view while installing the camera, the user can effectively determine if a particular placement provides satisfactory performance while positioning the device.

FIG. 1A illustrates an example of using an AR device 120 to assist in the installation and configuration of various devices 132, 134 within a property 101. In some examples, the AR device 120 may be used by a user 102 to visualize device information on a visual interface 104 to place the devices 132 and 134 in locations within a region of the property 101 where network connectivity with a monitor control unit 110 (or another other network-enabled device) is satisfactory. The monitor control unit 110 and the devices 132, 134 are described more particularly with respect to FIG. 2.

Figure 1B:
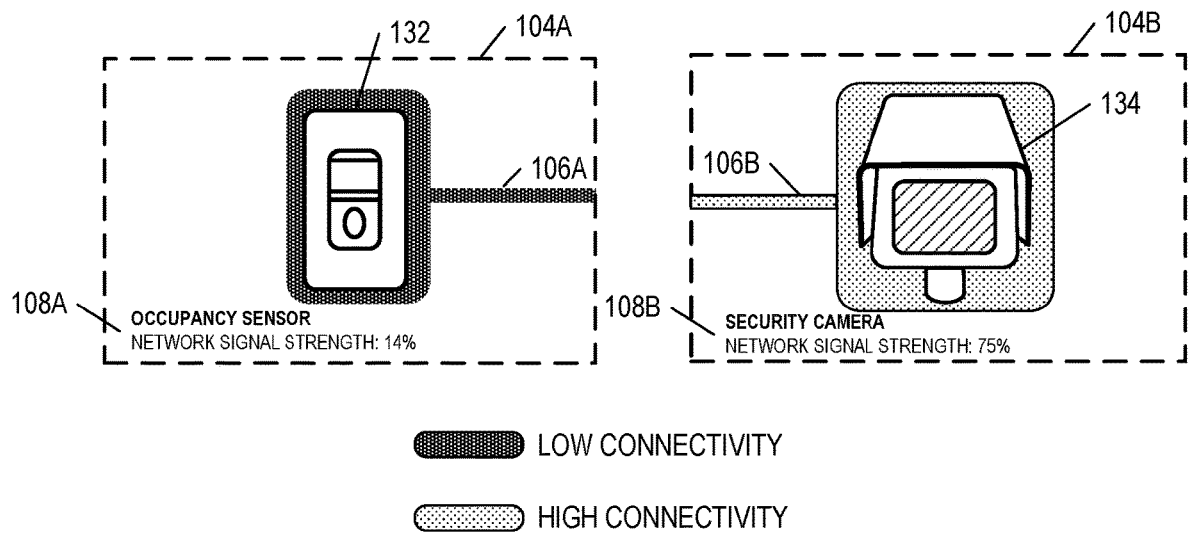
FIG. 1B illustrates examples of augmented reality heads-up displays that include network connectivity visualizations.

In the example depicted in FIG. 1A, the AR device 120 may be used to visualize network connectivity information to assist the installation components of a monitoring system, e.g., a home security system, within the property 101. For instance, the device 132 may be a security camera that captures video footage of a living room of the property 101 and the device 134 may be an occupancy sensor that measures the presence of individuals within the same region. During an installation operation, the visual interface 104 may be used to visualize real-time network connectivity data as the devices 132 and 134 are moved to various locations within the living room. As depicted in FIG. 1B, the visualizations may be represented with different color patterns and/or textual information that are provided for display within the visual interface 104 nearby the present location of the devices 132 and 134 within the field of view of the user 102. For example, the visualization may be an arc between a device and the monitor control unit 110.

The visual interface 104 may be used to track real-time network connectivity of the devices 132 and 134 in relation to the present location within the property 101 during the installation of the devices 132 and 134 by the user 102. For example, the user 102 may use the optical recognition capabilities of the AR device 120 to register the devices 132 and 134. The locations of the devices 132 and 134 within the property 101, as detected within the visual interface 104 by the AR device 120, may be monitored in coordination with network connectivity data detected by the monitor control unit 110. The process by which location information of the devices 132 and 134 is correlated with corresponding network connectivity data of the devices 132 and 134 is described more particularly with respect to FIG. 3 below.

FIG. 1B illustrates examples of visual interfaces 104A and 104B for the devices 132 and 134, respectively. The visual interface 104A displays visualizations 106A and 108A corresponding to the device 132 and the visual interface 104B displays visualizations 106B and 108B corresponding to the device 134. The visual interfaces 104A and 104B may represent overlays that are generated on lenses of the AR device 120 that the user sees through. In some instances, the visual interfaces 104A and 104B may be projected onto a surface of the property, e.g., a wall, a door, etc.) where a corresponding device is placed. In other instances, the visual interfaces 104A and 104B may instead be projected at a distance within the field of view of the user 102.

In the examples depicted in FIG. 1B, the visualizations 106A and 106B represent graphical overlays that are superimposed on the location of the corresponding device within the augmented field of view of the AR device 120. As discussed above, the optical recognition techniques of the AR device 120 may be used to coordinate the placement visualizations 106A and 106B according to the locations of the corresponding devices. As an example, the display of the visualizations 106A an 106B may be adjusted relative to movement of the AR device 120 and/or the user 102 to the location of the corresponding device, e.g., as the user 102 moves throughout the room during an installation operation. In another example, the display of the visualizations 106A and 106B may also be adjusted as the user 102 changes the placement of the corresponding device within a different location of the property.

The optical attributes of the visualizations 106A and 106B may be used to represent different types of monitored data associated with the devices 132 and 134. For example, as depicted in FIG. 1B, color variations may be used to represent different measured network connectivity by the monitor control unit 110, e.g., a dark color representing a low measured network connectivity for the device 132, and a light color representing a high measured network connectivity for the device 134. In other examples, other optical attributes such as the shape, overlay pattern, or the size of the visualizations 106A and 106B may also be used to represent types of monitored data associated with the devices 132 and 134.

The visualizations 108A and 108B may be used to represent textual information related to monitored data associated with the devices 132 and 134. For example, as depicted in FIG. 1B, the, the visualizations 108A and 108B may represent percentage values representing network signal strengths for the device 132 and the device 134, respectively. In other examples, the visualizations 108A and 108B may include other text corresponding to other types of device information, e.g., hardware identifiers, installation instructions, data logs collected by the devices 132 and 134 based on communications with the monitor control unit 110, etc. In this regard, the visualizations 108A and 108B may be used to represent pertinent information that may impact a monitored and/or sensed values for the devices 132 and 134, e.g., measured network connectivity strength.

Figure 2:
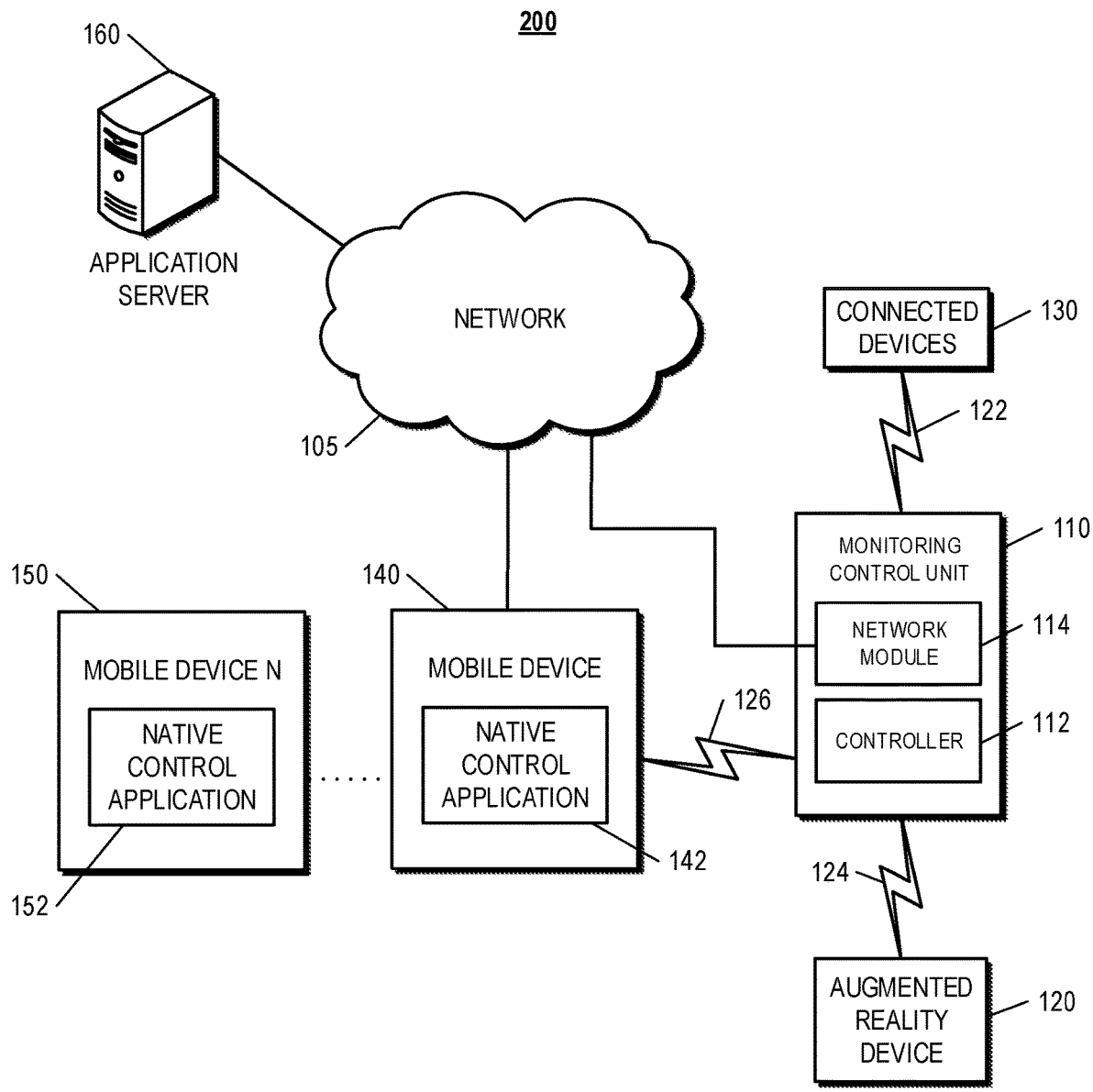
FIG. 2 illustrates an example of a system that is capable of generating network connectivity visualizations.

FIG. 2 illustrates an example of a system 100 that is capable of generating augmented visualizations to improve the installation and configuration of components of a monitoring system. The system 100 may include a monitor control unit 110, an augmented reality (AR) device 120, one or more connected devices 130, one or more user devices 130, 150, and an application server 160 connected over a network 105. The components of the system 100 may exchange communications over the network 105.

In general, the system 100 enables a user such as the user 102 illustrated in FIG. 1A to visualize information related to the connected devices 130 within a visual interface during an installation or maintenance operation at a property. For instance, as depicted in FIG. 1A, the system 100 enables the user to place one of the connected devices 130 in different locations of a region of the property and visualize the impact on the network signal strength when the connected device is placed in a certain location. In this regard, the system 100 can be used to more conveniently display pertinent information to assist the user in determining the optimal configuration of the system 100 in real-time during an installation operation. Although the operations of the system are described with respect to installation of the connected devices 130 within the property 101, in some instances, similar techniques may be used to monitor and/or diagnose issues related to the functioning of one of the connected devices 130 during a maintenance operation.

Referring now to the components of the system 100, the network 105 may be configured to enable exchange of electronic communications between devices illustrated in FIG. 2. For example, the network 105 may be configured to enable exchange of electronic communications between the monitor control unit 110, the augmented reality device 120, the one or more connected devices 130, the one or more user devices 130, 150, and the application server 160.

The network 105 may include, for example, one or more of the Internet, Wide Area Networks (WANs), Local Area Networks (LANs), analog or digital wired and wireless telephone networks, e.g., a public switched telephone network (PSTN), Integrated Services Digital Network (ISDN), a cellular network, and Digital Subscriber Line (DSL), radio, television, cable, satellite, or any other delivery or tunneling mechanism for carrying data. The network 105 may include multiple networks or subnetworks, each of which may include, for example, a wired or wireless data pathway.

The network 105 may also include a circuit-switched network, a packet-switched data network, or any other network able to carry electronic communications, e.g., data or voice communications. For example, the network 105 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 105 may include one or more networks that include wireless data channels and wireless voice channels. The network 105 may be a wireless network, a broadband network, or a combination of networks including a wireless network and a broadband network.

The monitor control unit 110 may be an electronic device that coordinates and/or monitors the operations of the components of the system 100 through a set of data transmissions with each of the components of the system 100. The monitor control unit 110 includes a controller 112 and a network module 114. The controller 112 is configured to control the system 100, e.g., a home alarm or security system, that includes the monitor control unit 110. In some examples, the controller 112 may include a processor or other control circuitry configured to execute instructions of a program that controls operation of an alarm system. In these examples, the controller 112 may be configured to receive input from sensors, detectors, or other devices included in the alarm system and control operations of devices included in the alarm system or other household devices, e.g., a thermostat, an appliance, lights, etc. For example, the controller 112 may be configured to control operation of the network module 114 included in the monitor control unit 110.

The network module 114 is a communication device configured to exchange communications over the network 105. The network module 114 may be a wireless communication module configured to exchange wireless communications over the network 105. For example, the network module 114 may be a wireless communication device configured to exchange communications over a wireless data channel and a wireless voice channel. In this example, the network module 114 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 114 may also be a wired communication module configured to exchange communications over the network 105 using a wired connection. For instance, the network module 114 may be a modem, a network interface card, or another type of network interface device. The network module 114 may be an Ethernet network card configured to enable the monitor control unit 110 to communicate over a local area network and/or the Internet. The network module 114 also may be a voice-band modem configured to enable the alarm panel to communicate over the telephone lines of Plain Old Telephone Systems (POTS).

The monitor control unit 110 also may include a communication module that enables the monitor control unit 110 to communicate with other devices of the system 100. The communication module may be a wireless communication module that allows the monitor control unit 110 to communicate wirelessly. For instance, the communication module may be a Wi-Fi module that enables the monitor control unit 110 to communicate over a local wireless network at the property 101. The communication module further may be a 900 MHz wireless communication module that enables the monitor control unit 110 to communicate directly with a monitor control unit. Other types of short-range wireless communication protocols, such as Bluetooth, Bluetooth LE, Z-Wave, ZigBee, etc., may be used to allow the monitor control unit 110 to communicate with other devices in the property 101.

In some examples, the monitor control unit 110 may include data capture and recording devices. In these examples, the monitor control unit 110 may include one or more motion sensors, one or more microphones, one or more biometric data collection tools, one or more temperature sensors, one or more humidity sensors, one or more air flow sensors, and/or any other types of sensors that may be useful in capturing monitoring data related to the property 101 and users in the property.

The monitor control unit 110 further may include processor and storage capabilities. The monitor control unit 110 may include any suitable processing devices that enable the monitor control unit 110 to operate applications and perform the actions described throughout this disclosure. In addition, the monitor control unit 110 may include solid state electronic storage that enables the monitor control unit 110 to store applications, configuration data, collected sensor data, and/or any other type of information available to the monitor control unit 110.

The monitor control unit 110 may exchange communications with the AR device 120, the connected devices 130, the one or more mobile devices 140, 150, and the application server 160 using multiple communication links. The multiple communication links may be a wired or wireless data pathways configured to transmit signals from the AR device 120, the connected devices 130, the one or more mobile devices 140, 150, and the application server 160 to the controller 112. The AR device 120, the connected devices 130, the one or more mobile devices 140, 150, and the application server 160 may continuously transmit sensed values to the controller 112, periodically transmit sensed values to the monitor control unit 110, or transmit sensed values to the monitor control unit 110 in response to a change in a sensed value.

In some implementations, the monitor control unit 110 may locally monitor the operation of the electronic devices of the system 100 such the AR device 120, the connected devices 130, and/or the one or more mobile devices 140, 150. For instance, the monitor control unit 110 may enable or disable the devices of the system 100 based on a set of rules associated with energy consumption, user-specified settings, and/or other information associated with the conditions near or within the property 101 where the system 100 is located. In some examples, the monitor control unit 110 may be used as a replacement to a traditional security panel that is used to monitor and control the operations of the system 100. In other examples, the monitor control unit 110 may coordinate monitoring operations with a separate security panel of the system 100. In such examples, the monitor control unit 110 may monitor particular activities of the devices of the system 100 that are not monitored by the security panel, or monitor the operation of particular devices that are not monitored by the security panel.

As described above, the property 101 may include various components or devices that are each capable of performing individual monitoring operations and/or capable of performing a set of coordinated operations based on instructions received from either the monitor control unit 110 or the application server 160. For instance, the property 101 may include the AR device 120, the connected devices 130, the one or more mobile devices 140, 150, and the application server 160, and other devices that provide monitoring data associated with devices, areas, or individuals located nearby or within the premises of the property 101. As an example, the connected devices 130 may include sensors located on the property 101. The sensors may include motion sensors, heat sensors, pressure sensors, resistive sensors, etc. that periodically collected sensed data indicating conditions of the property 101. The connected devices 130 may communicate with the other devices of the system 100 and transmit monitoring data for processing to the monitoring control unit 110. In some examples, the connected devices 130 may store collected data locally or transmit monitoring data to be stored in a remote location, e.g., the application server 160.

The monitor control unit 110, the AR device 120, the connected devices 130, the one or more mobile devices 140, 150, and the application server 160 may exchange data transmissions over the network 105 using multiple communication links. In some instances, the multiple communication links may include a local network within the network 105. For instance, the monitor control unit 110, the AR device 120, the connected devices 130, the one or more mobile devices 140, 150, and the application server 160 may exchange data and commands over the local network as described herein. The local network may include 802.11 "Wi-Fi" wireless Ethernet, e.g., using low-power Wi-Fi chipsets, Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The AR device 120 may be a wearable electronic device that is capable of displaying information on a visual interface, e.g., visual interfaces 104A and 104B illustrated in FIG. 1B. The AR device 120 may render the visual interface using an optical projection system to display virtual objects over a user's field of view.

The AR device 120 may include various hardware components. For instance, the AR device 120 may include a processor, a display, sensors, and input devices. In some implementations, the AR device 120 is capable of executing native applications that enable users to interact with a user interface in specific ways to control the operation of the AR device 120, or perform other monitoring operations related to the components of the system 100. For example, the native application may enable users to provide inputs using head nod gestures. As an example, a head nod in a particular direction may cause the native control application to navigate through menus, to zoom in or out on particular information presented on the visual interface, to toggle the display of information relating to various components of the system 100, or to activate or deactivate the system 100. In another example, the native application may enable users to provide inputs using hand gestures on a virtually rendered interface.

The AR device 120 may be one or more of different types of wearable devices. In some implementations, the AR device 120 may be a head-mounted display (HMD) device that is placed on the user's forehead using a harness or a helmet. In such implementations, the HMD device may include various sensors to monitoring the head movement of the user and aligning virtual information to be presented within the visual interface with the corresponding information viewable in the physical world. In other implementations, the AR device 120 may be eyewear, e.g., eyeglasses, that are placed over the eyes of the user. The eyewear may include cameras for capturing video footage of the user's field of view, and a visual interface that is projected through or reflected off the surfaces of the eyewear lens pieces. In other implementations, the AR device 120 may be a heads-up display (HUD) device that projects an augmented HUD in front of the user's field of view. For example, the augmented HUD may display virtual representations of data, information, and images superimposed on a user's field of view of the physical world. In some other examples, the AR device 120 may be implantable and/or attachable electronic devices, e.g., bionic contact lens that contain electronic elements such as integrated circuitry, LEDs, and/or an antenna for wireless communication.

The AR device 120 may feature one or more cameras and/or one or more means of providing user input, e.g., via a touch screen, by using gestures, or other inputs. For example, the AR device 150 may be an optical head-mounted display (OMHD) device that displays information and enables user interaction in a hands-free format by using natural language voice commands, gestures, or other actions. The AR device 120 can then communicate with one or more components of the system 100, e.g., the monitor control unit 100, using wireless connections.

In some implementations, the AR device 120 may communicate with the monitor control unit 110 via the communication link 124. For instance, the AR device 120 can communicate with the monitoring control unit 110 using various local wireless protocols, such as Wi-Fi, Bluetooth, Z-Wave, ZigBee, HomePlug (Ethernet over powerline), or wired protocols such as Ethernet, USB, and other wired protocols based on the RS232, RS485, and/or RS422 standards. The AR device 120 can connect locally to the monitoring control unit 110 and/or other components of the monitoring system 110, e.g., one or more cameras, sensors, or other components of the connected devices 130. The local connection can improve the speed of communications because communicating through the network 105 with a remote server, e.g., the application server 160, can be slower.

In some implementations, instead of being a separate component within the system 100, the AR device 120 may instead be one of the mobile devices 140, 150. In such implementations, the mobile devices 140, 150 may run a native application that is capable of capturing video footage of the property and rendering visualizations that represent device information onto the screen of the mobile devices 140, 150. For example, the native application may utilize optical recognition techniques to detect a presence of one of the connected devices within the field of view of the captured video footage, and then use the processing capabilities of the mobile devices 140, 150 to render the visualizations onto the screen of the mobile devices 140, 150. In such an example, the user 102 may adjust the field of view by moving the mobile devices 140, 150 relative to the locations of the connected devices 130.

The connected devices 130 can include various types of monitoring devices that are placed within the property 101. The connected devices 130 may include components of a monitoring system, e.g., a security system for the property 101, or other separate smart devices that are configured to exchange communications over a local network within the property 101. For example, the connected devices 130 may include one or more of sensors, cameras, appliances, HVAC components, or other components that are installed and/or configured to operate within the property 101.

In general, the connected devices 130 may be configured to monitor and/or control various aspects of the property. For example, cameras and/or sensors associated with the system 100 may be configured to monitor activity and/or conditions in various regions of the property 101, e.g., at various indoor or outdoor locations of the property 101. Cameras included within the connected devices 130 can include various video, still-image, infrared, night-vision, or other cameras that are configured to monitor activity at a property. Sensors within the connected devices 130 may include various activity sensors, such as motion sensors, contact sensors, etc., or may additionally or alternatively include various environmental sensors, such as temperature sensors, humidity sensors, noise sensors, light sensors, air quality sensors, smoke detectors, carbon monoxide detectors, water sensors, rain sensors, wind sensors, etc. Other components associated with the connected devices 130 may include door and window locks, furnaces, air conditioners, ovens and stovetops, fans, garage doors, etc.

The connected devices 130 may communicate with the monitor control unit 110 over the communications links 122. The communication link 122 may be a wired or wireless data pathway configured to transmit signals from the connected devices 130 to the monitor control unit 110. The connected devices 130 can continuously transmit and receive data from the controller 112, can periodically transmit and receive data from the controller 112, or can transmit and receive data from the controller 112 in response to detecting events, e.g., in response to detecting a change in a sensed value by a sensor of the monitoring system. The cameras, sensors, and other components of the monitoring system that are in communication with the monitor control unit 110 via the connected devices 130 can continuously or periodically transmit and receive information from the connected devices 130, or can transmit and receive information from the connected devices 130 in response to detecting a specific event, e.g., an event at the property or an error relating to one or more of the cameras, sensors, or other components.

In some implementations, the connected devices 130 can communicate directly with the application server 160 over the Internet without communicating through the monitor control unit 110. For example, the application server 160 may communicate with a camera, sensor, or other component to send and/or receive information related to controlling the camera, sensor, or component, information identifying the status of the camera, sensor, or component, or other information. In some instances, the application server 160 may communicate information directly to one or more cameras, sensors, and/or other components.

The one or more mobile devices 140, 150 may be devices that execute one or more native applications, e.g., native control applications 142, 152. The one or more mobile devices 140, 150 may be cellular phones or non-cellular locally networked devices. For instance, the one or more devices 140, 150 can include a cell phone, a smart phone, a tablet computing device, a laptop computing device, a personal digital assistant ("PDA"), a wearable computing device, or any other stationary or portable device configured to communicate with other devices over a network. For example, implementations can include electronic organizers, multimedia devices, portable music players, communication devices, and handheld, wearable, or portable electronic devices for gaming and/or data organization. The one or more mobile devices 140, 150 may be the same or can include mobile devices of different types. The one or more mobile devices 140, 150 may also perform functions unrelated to the monitoring system, such as placing personal telephone calls, playing music, playing video, displaying pictures, browsing the Internet, maintaining an electronic calendar, etc.

In some implementations, the one or more mobile devices 140, 150 can communicate with the monitor control unit 110 via the communication link 224. For instance, the one or more mobile devices 140, 150 can communicate with the monitor control unit 110 using various local wireless protocols, such as Wi-Fi, Bluetooth, Z-Wave, ZigBee, HomePlug (Ethernet over powerline), or wired protocols such as Ethernet, USB, and other wired protocols based on the RS232, RS485, and/or RS422 standards. The one or more mobile devices 140, 150 can connect locally to the monitor control unit 110 and/or other components of the monitoring system 200, e.g., one or more cameras, sensors, or other components. The local connection can improve the speed of communications because communicating through the network 105 with a remote server, e.g., the application server 160, can be slower.

Although the one or more mobile devices 140, 150 are shown communicating with the monitor control unit 110, in some implementations, the one or more mobile devices 140, 150 can communicate directly with the cameras, sensors, and other components that are in communication with the monitor control unit 110. In some implementations, the one or more mobile devices 140, 150 replace the monitor control unit 110 and perform the functions of the monitor control unit 110 for local control and long range or offsite communication and/or control.

In other implementations, the one or more mobile devices 140, 150 may receive data from the monitor control unit 110 through the network 105. The one or more mobile devices 140, 150 may either receive data from the monitor control unit 110 through the network 105, or from the application server 160 and transmit or relay the data to the monitor control unit 110 through the network 105. In this regard, the application server 160 may facilitate communications between the one or more mobile devices 140, 150 and the monitor control unit 110.

Although the one or more mobile devices 140, 150 are shown in FIG. 2 as being connected to the network 105, in some implementations, the one or more mobile devices 140, 150 are not connected to the network 105. In such implementations, the one or more mobile devices 140, 150 may communicate directly with one or more of the monitoring system components without requiring a network connection, e.g., using a Bluetooth connection, or a near-field communication (NFC) connection.

In some implementations, the one or more mobile devices 140, 150 are used in conjunction with only local cameras, sensors, and other components of the system 100. In such implementations, the system 100 only includes the one or more mobile devices 140, 150 and the connected devices 130. The one or more mobile devices 140, 150 may receive data directly from the connected devices 130, and can send data directly to the connected devices 130. The one or more mobile devices 140, 150 may provide the appropriate interfaces and/or processing to provide for control of the system 100, including capabilities to modify system preferences, control system components, and/or respond to events detected by the system 100, etc.

The one or more mobile devices 140, 150 each include native control applications 142, 152, respectively. The native control applications 142, 152 may refer to software/firmware programs running on the corresponding device that enables the described features. The one or more mobile devices 140, 150 may load or install the native control application 142, 152 based on data received over the network 105 or data received from local media. The native monitoring application 142, 152 may run on the operating systems of the mobile devices 140, 150.

The application server 160 may be an electronic device configured to provide monitoring services and enable monitoring system configuration by exchanging electronic communications with the monitor control unit 110, the AR device 120, the connected devices 130, and/or the one or more mobile devices 140, 150 over the network 105. For example, the application server 160 may be configured to receive video data collected by cameras of the AR device 120. In addition, the application server 160 can receive information related to the connected devices 130. e.g., network signal strength, installation status, etc., through the monitor control unit 110.

In some implementations, the application server 160 may process the received video data and the information related to a connected device in order to generate visualization instructions for displaying the information for the connected device when the connected device is within the field of view of the camera of the AR device 120. In this regard, the application server 160 may perform the processing techniques necessary to correlate present location information and the present device information in order to generate visualizations that represent such correlations within the visual interface provided for output by the AR device 120.

In some implementations, the application server 160 may be connected to the Internet over the network 105 and can access information at a website or database that is accessible on the Internet. Additionally, or alternatively, the application server 160 may store information at a local database or other data storage component and can access the stored information. For example, the application server 160 may access installation instructions or troubleshooting instructions relating to cameras, sensors, or other components of the system 100 at a website or database that is accessible via the Internet. The application server 160 may access the installation or troubleshooting instructions and can transmit information associated with the instructions to AR device 120, for example, by causing visualizations to be presented in the visual interface provided for output by the AR device 120.

The application server 160 may store data, e.g., video or image data obtained by cameras of the system 100, sensor data from sensors of the system 100, or performance data from appliances or HVAC system components associated with the system 200, and can perform analysis of the stored data. Based on the analysis, the application server 160 may communicate with and control components of the system 100, such as one or more cameras, sensors, or other components of the connected devices 130 that are connected to the monitor control unit 110 over the network 105.

Figure 3:
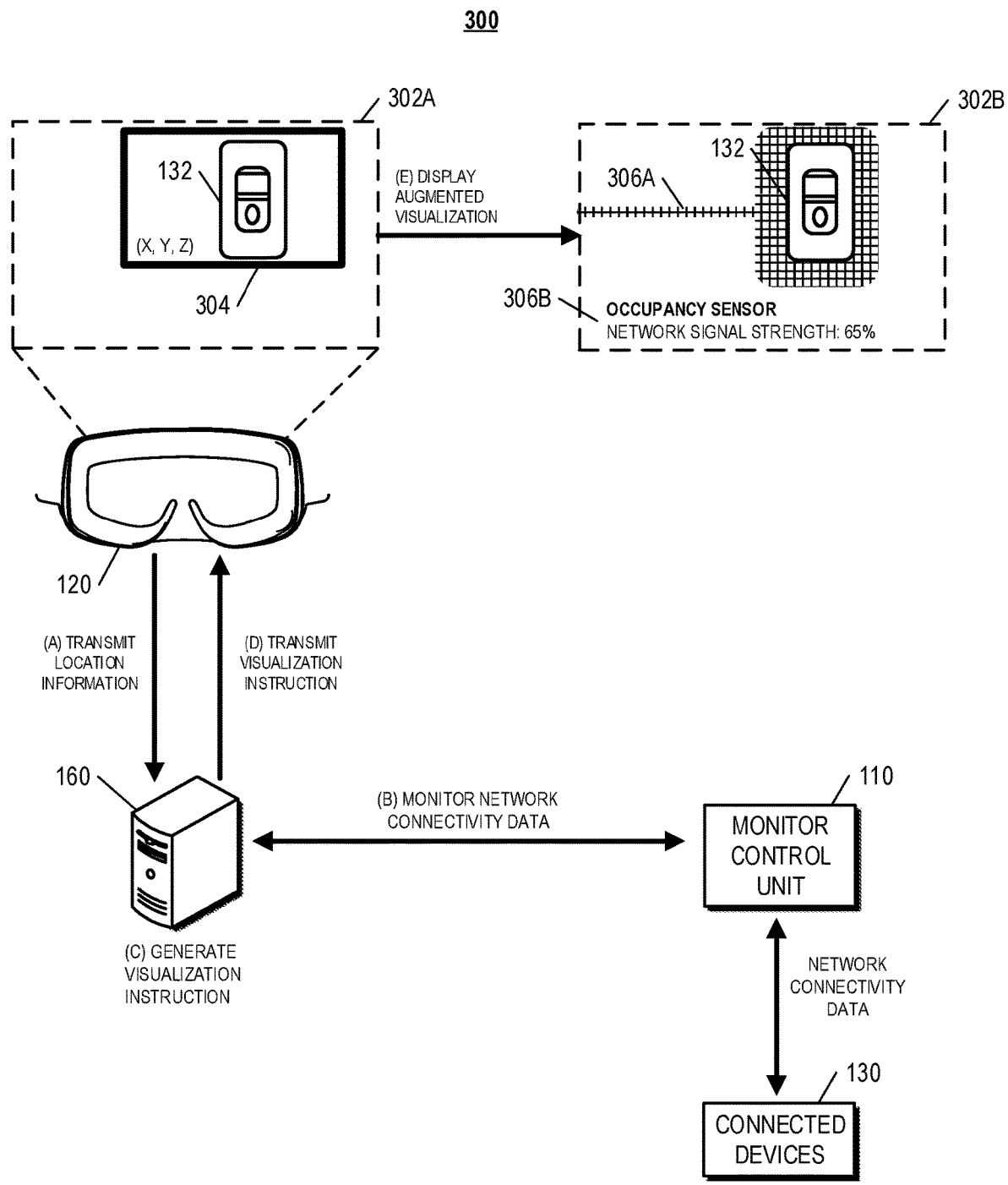
FIG. 3 illustrates an example of a process for generating network connectivity visualizations of a device within a property.

FIG. 3 illustrates an example of a process 300 for generating visualizations that represent connectivity information for the device 132 within the property 101 depicted in FIG. 1A. The process 300 may initially include performing a location registration of the location 304 of the device 132 within a current visual interface 302A of the AR device 120. The AR device 120 then transmits the location information corresponding to the device 132 to the application server 160. The application server 160 may periodically monitor network connectivity data of the device 132 by exchanging communications with the monitor control unit 110 over the network 105. The location information and the network connectivity data may be periodically monitored and then be correlated by the application server 160 to generate visualization instructions. The visualization instructions can then be used by the AR device 120 to render the visualizations 306A and 306B within the field of view 302B.

The AR device 120 initially performs a location registration of the device 132 within the visual interface 302A. The user 102 may adjust his/her field of view so that the device 132 is within a detectable range of the AR device 120. The user 102 may then provide a manual input indicating and/or selecting the device 132 within the visual interface 302A. In some implementations, the manual input may include providing a gesture to indicate that a connected device is present within the field of view of the AR device 120. In other implementations, the manual input may be an indication of the location of the device 132 using a cursor element that is viewable to the user within the visual interface, e.g., manually drawing a region of interest and/or selecting a central point associated with the device location. The AR device 120 may then use optical recognition techniques to identify optical attributes of the region of interest within the visual interface 302 indicated by the user input and then associate the identified optical attributes to a particular device. Examples of optical attributes may include pixel intensity distributions, characteristic colors, object recognition, among others. In some examples, the visual interface 302 may capture an image that includes the region of interest of the particular device specified by the user. The captured image may then be transmitted to the application server 160 for identification and monitoring of the device 132.

In some implementation, the location registration of the device 132 also includes submission of device information to the AR device 120. For instance, after providing the user input indicating the region of interest within the visual interface 302A corresponding to the location 304, the user 102 may also be prompted to provide device information to identify the device, e.g., IP address, MAC address, or other device identifiers. Alternatively, or additionally, in some implementations, the AR device 120 may use various wireless communication protocols to obtain such device information automatically without prompting any user input, e.g., a Bluetooth connection, an IR connection, or an NFC connection. In such implementations, the device 132 may be configured to relay a connection request that is then detected by the AR device 120.

After obtaining an indication of the location 304, the application server 160 may then associate the identified optical attributes corresponding to the location 304 and device information for the device 132 within a device information repository. For example, the application server 160 may initially obtain device information, e.g., device type, hardware identifiers associated with the particular device, based on accessing account information associated with the user that indicates a list of devices associated with the user account. The application server 160 may then associate the obtained device information with a unique device identifier and store a new record with the device identifier and the device information within the device information repository. The device code may then be used by the AR device 120 to associate visualizations to corresponding devices within the user's field of view.

The device information repository may relate device information with identified optical attributes in order to enable the AR device 120 to recognize when a particular device is present within the visual interface after the initial device registration. The device information repository may be updated after each location registration procedure to include new device information for each connected device that is registered by the user 102. In this regard, the device information repository may be accessed by the AR device 120 to simultaneously detect the presence of multiple devices within the augment display by identifying optical attributes of the multiple devices within the visual interface that are included within the device information repository.

The device information repository may either be stored locally on the AR device 120 or remotely on the application server 160. In instances where the AR device 120 locally stores the device information repository, the visualization instructions received from the application server 160 may specify one or more device identifiers and a set of visualizations corresponding each of the one or more device identifiers. The AR device 120 then locally processes the visualization instructions by correlating the included device identifiers with the device identifiers included within the device information repository to determine when to render visualizations included within the instructions when detecting optical attributes associated with a corresponding device. Alternatively, in instances where the application server 160 remotely stores the device information repository, the device information repository may be periodically updated by the application server 160 to include visualizations corresponding to the device identifiers. In such implementations, the applications server 160 performs the processing operations necessary to correlate optical attributes with visualizations to be displayed, and includes the device information repository within the visualization instructions that are transmitted to the AR device 120. The AR device 120 then renders the visualizations included within the device information repository based on detecting the presence of optical attributes associated with a particular device. In other instances, a combination of the two techniques described above may be used to optimize performance by reducing latency associated with rendering the visualizations.

The application server 160 generates visualization instructions by correlating device identifiers and optical attributes of a particular device, e.g., the device 132, indicated by the device information repository and the network connectivity data measured for the particular device at a particular time point. This may be accomplished using a configuration file that includes a set of visualization parameters. The visualization parameters may include a set of predetermined thresholds associated with the monitored network connectivity data. For example, the configuration file may include three ranges for measured download speeds with upper and lower bound thresholds, and for each measured range, specify a particular color for a visualization to be displayed, e.g., 15-30 kb/s—display Red, 31-60 kb/s—display Blue, 61-90 kb/s—display Green. In another example, the configuration file may specify a different type of visualization to display for different types of measured data, e.g., measured download speed—display text element with measured value, detected lapse in connectivity—display alert message. In this regard, the configuration file may be used to determine different categories of visualizations to display based on the measured connectivity data, and/or also determine the arrangement of the visualizations to display within the augment display.

The visualization configuration file may either be stored locally on the AR device 120 or remotely on the application server 160. In instances where the configuration file is locally stored on the AR device 120, the application server 160 transmits a data package that includes the measured network connectivity data of a particular device to the AR device 120. The AR device 120 then processes the received data package and generates the visualization based on the specifications provided by the configuration file. Alternatively, in instances where the configuration file is stored on the application server 160, the application server 160 generates the visualization instruction based on identifying the visualization parameters. The generated visualization instructions may then be executable code that is used by the AR device 120 to generate the visualization.

The AR device 120 then uses the visualization instruction to generate and render the visualizations within the visual interface 302B. In the example depicted in FIG. 3, the visualization instruction may be used by the AR device 120 to determine the number of visualizations to render, e.g., the visualization 306A and visualization 306B, and the information to represent within each visualization. For instance, the visualization 306A represents graphical information that is associated with the presently measured network signal strength of the device 132 as described with respect to FIG. 1B. The visualization 306B instead represents the value of measured network signal strength as a percentage of a reference value, e.g., 65%. As described above, the visualization instructions can be used to determine the type of information to represent within the visual interface 302B, the arrangement of visualizations within the visual interface 302B, as well as the actual measured values.

As described above, the process 300 is periodically performed to enable the user 102 to visualize monitored network connectivity data in relation to the position of the device 132 within a region of the property. The frequency at which the process 300 is performed may vary based on the requirements for the particular installation and/or maintenance operation performed by the user, or the processing capabilities of the AR device 120. For instance, in some implementations, the process 300 is performed at fixed time intervals, e.g., every two minutes, that correspond to the frequency of movement of the device 132. In such implementations, the application server 160 monitors the network connectivity data at the end of each fixed time interval, which then causes the AR device 120 to adjust the rendering of the visualizations based on the periodically monitored network connectivity data. In other instances, the process 300 may be performed in real-time to simultaneously adjust the rendering of the visualizations in relation to the changes in location of the device 132. In such implementations, the application server 160 may continuously monitor the network connectivity data measured for the device 132, and transmit updated visualization instructions to the AR device 120 in response to changes in the monitored network connectivity data.

FIG. 4 illustrates an example of a process 400 for generating network connectivity visualizations for display on an augmented reality heads-up display. Briefly, the process 400 may include obtaining data indicating a current field of view of an augmented reality device (410), obtaining data indicating locations of one or more devices with the current field of view (420), obtaining network connectivity data associated with the one or more devices in response to obtaining data indicating locations of the one or more devices (430), and generating one or more visualizations representing the network connectivity data for output within the current field of view (440).

In more detail, the process 400 may include obtaining data indicating a current field of view of an augmented reality device (410). For instance, the AR device or the application server 160 may obtain data that indicates a current field of view of an visual interface, e.g., the visual interface 104) of the AR device 120. The field of view coincides with a detectable region where a connected device, e.g., the device 132, may be present and/or where a visualization representing information corresponding to monitored data for the connected device may be presented.

The process 400 may include obtaining data indicating locations of one or more devices with the current field of view (420). For instance, as discussed above with respect to FIG. 3, if the user 102 is performing a location registration procedure for a device that has not previously been detected by the AR device 120, the obtained data may include location information, e.g., the location 304, indicated by a manual input by the user 102, or a passively detected location based on wireless communication exchanged between the AR device 120 and the device 132. The obtained data may also include one or more optical attributes that are identified within a region of interest associated with the location of the device 132. Alternatively, if the device 132 that is present within the current field of view of the AR device 120 has previously been registered and included within the device information repository, the obtained data may include identified optical attributes that are predetermined to be associated with the device 132, e.g., as indicated by the device information repository) and corresponding location information for the identified optical attributes.

The process 400 may include obtaining network connectivity data associated with the one or more devices in response to obtaining data indicating locations of the one or more devices (430). For instance, the application server 160 may periodically obtain network connectivity data for the device 132 in response to obtaining data that indicates that the device 132 is present within the current field of view of the AR device 120. In some instances, the network connectivity data may be obtained by the application server 160 from the monitor control unit 110, which directly periodically monitors the network connectivity data for the device 132.

The process 400 may include generating one or more visualizations representing the network connectivity data for output within the current field of view (440). For instance, the application server 160 or the AR device 120 may generate visualizations representing the obtained network connectivity data for the device 130 for output to the field of view of the AR device 120. As described above, the visualizations may be generated according to a configuration file that includes visualization specifications based on measured values within the monitored network connectivity data. Examples of visualization specifications may include the types of visualizations to be generated, e.g., graphical information, textual information, values and/or other attributes associated with the visualizations, e.g., color to display for a graphical overlay, size of text to display, and/or an arrangement of visualizations to be displayed, e.g., positioning of visualizations within a HUD. As described with respect to FIG. 3, the visualization specifications may be determined either by the application server 160 or the AR device 120 directly. In some instances, the application server 160 determines the visualization specifications based on the location information of the device 132 within the current field of view, the monitored network connectivity data for the device 132, and the information included within the configuration file. In such instances, the application server 160 generates a visualization instruction that is then used by the AR device 120 to render the visualizations within the current field of view. Alternatively, in other instances, the AR device 120 may instead render the visualizations directly based on the location information of the device 132 within the current field of view, the monitored network connectivity data received from the application server 160, and the configuration file stored locally on the AR device 120.

Figure 5:
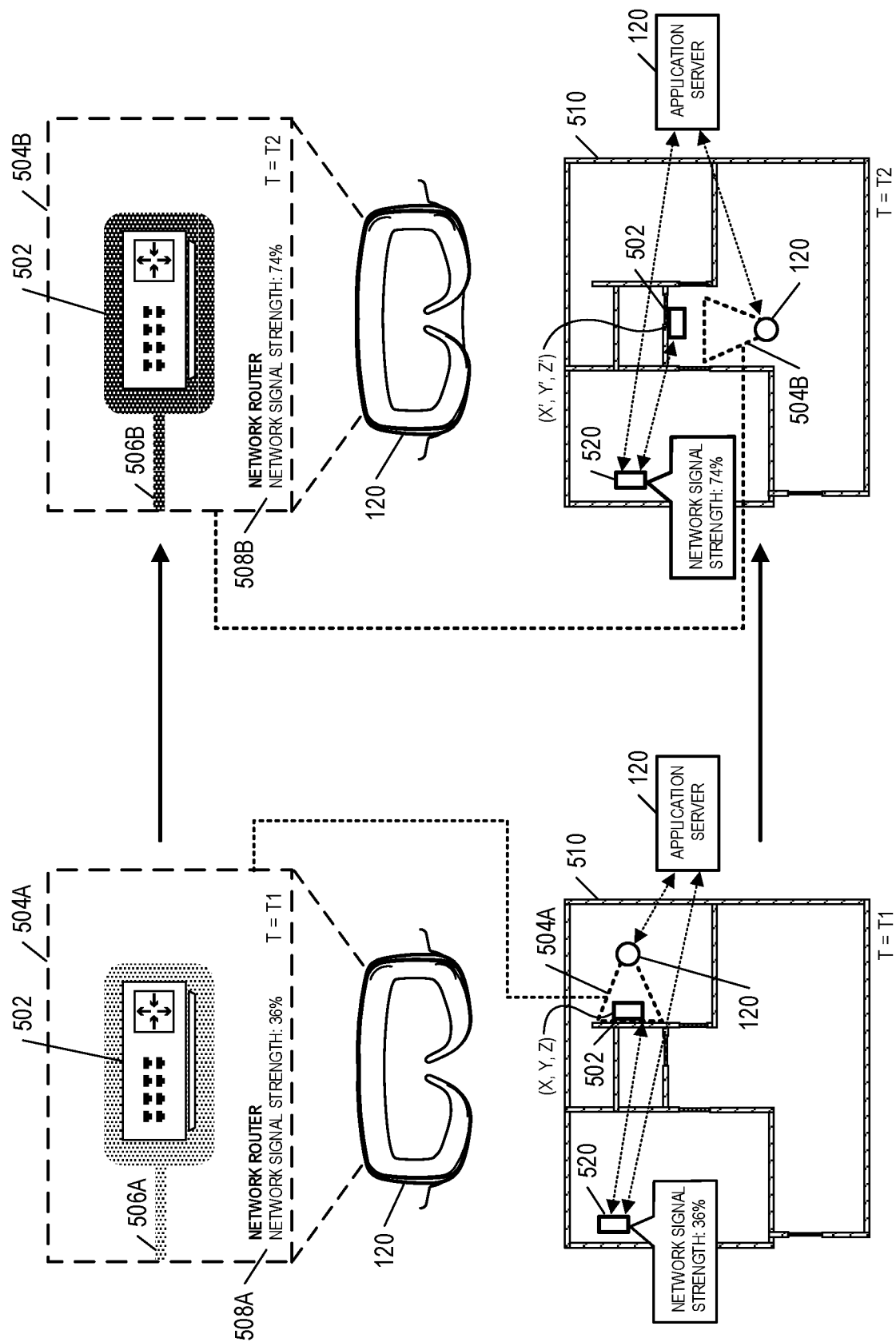
FIG. 5 illustrates an example of a system that is capable of adjusting network connectivity visualizations for a device based on detected movement of the device within a property.

FIG. 5 illustrates an example of a system 500 that is capable of adjusting a network connectivity visualization for a device 502 based on detected movement of the device 502 within a property 510. In the example depicted, a user, e.g., maintenance personnel, uses the AR device 120 during an installation of the device 502 within the property 510. In this example, the user uses a visual interface provided by the AR 120 to view detected network signal strengths for the device 502 in order to determine the best location in the property 510 to install the device 502. AR device 120 adjusts the virtualization as the user moves the device 502 to display different network connectivity statuses determined for the device 502 when placed at different locations.

In the example depicted in FIG. 5, the network device 502 represents a wireless network router that provides a wireless-based network, e.g., a Wi-Fi network, to network devices within the property 510 such as the network device 520. In this example, the signal strength of the network connection detected by the device 520 is used to identify the optimal location within the property to install the device 502, e.g., the location that provides the strongest signal strength for the location of the device 520 within the property 510. In this regard, the techniques depicted in FIG. 5 can be used to visualize network connectivity information to assist the user determine the best location within the property to install the device 502.

In the example depicted in FIG. 5, the AR device 120 is a head-mounted device that is capable of providing a visual interface as a projected screen in front of the user. The AR device 120 updates the visual interface to present different visualizations at different time points when the device 502 is moved throughout the property.

At the first time point, e.g., time point "Ti," the user places the device 502 in a first location within a bedroom of the property 510, e.g., a location specified by coordinates "(X, Y, Z)". At this location, the AR device 120 provides a visual interface 504A that presents a virtualization 506A to display network information 508A. The network information 508A is determined based on data 520A collected by a network device 520, which is configured to connect to a wireless network provided by the network device. After moving the device 502 from the first location to the second location, the user accesses a visual interface 504B that presents a visualization 506B that is generated based on network information 508B for the device 502 at a physical location within the property 501 specified by coordinates "(X', Y', Z')."

As shown in FIG. 5, the network information 508A indicates that the signal strength of the device 502 at the first location is "36%," whereas the signal strength of the device 502 at the second location is "74%." This difference in detected signal strength is represented in the visual interface as different visualizations being presented within the visual interfaces 504A and 504B. In the example, AR device 120 displays a darker visualization, e.g., visualization 506B, to indicate stronger signal strength detected at a specified location.

As discussed above, the visualizations 506A-B are generated based on monitoring network connectivity data collected by device 520 periodically, e.g., every minute, or alternatively, in real-time, in order to update the visualizations that are presented on the visual interfaces 504A-B. In the example depicted in FIG. 5, the device 520 may transmit a detected signal strength locally to a control unit within the property, e.g., the monitor control unit 110, which then transmits the monitored data to the application server 120 for updating the visualizations. Alternatively, the device 520 may directly exchange communications with the application server 120 to transmit the monitored data.

Figure 6:
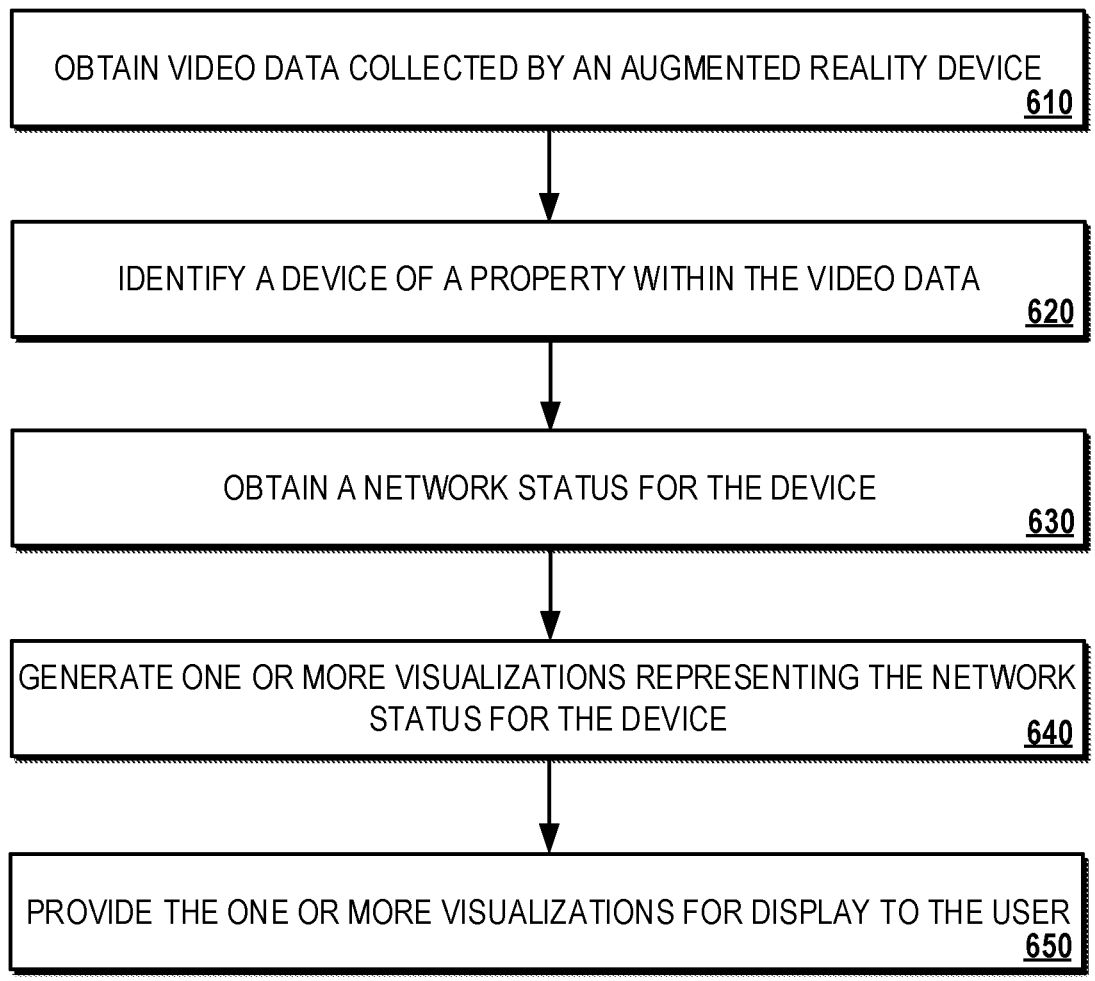
FIG. 6 illustrates an example of a process for generating network connectivity visualizations.

FIG. 6 illustrates an example of a process 600 for generating visualizations for display on a visual interface. Briefly, the process 600 can include the operations of obtaining video data collected by an augmented reality device (610), identifying a device of a property based on the video data (620), obtaining a network status for the device (630), generating one or more visualizations representing the network status for the device (640), and providing the one or more visualizations for display to the user (650).

In general, the process 600 is discussed below in reference to the system 200, although any suitable system may perform the operations discussed below. Additionally, although the operations are discussed below as being performed by the application server 160, in some implementations, one or more of the operations 600 can additionally, or alternatively, be performed on the AR device 120. For example, in some implementations, the operations of the process 600 can be performed locally by the components of the AR device 120 without requiring connectivity to the application server 160.

The process 600 can include the operation of obtaining video data collected by an augmented reality device (610). For example, the application server 160 can obtain video data collected by the AR device 120. In particular, the video data can identify a field of view of a camera of the AR device 120 capturing images of a physical environment of a property. In some implementations, the video data may be sequences of images of the physical environment captured by the AR device 120 where the images indicate the field of view of the camera. The video data can include one or more frames that show devices that are being monitored by the system 200. For example, as depicted in FIG. 1A, the obtained video data can include frames that include the devices 132 and 134.

The process 600 can include the operation of identifying a device of a property based on the video data (620). For example, the application server 120 can use optical recognition techniques to identify a device of the property within the obtained video data. In some instances, the application server 120 processes frames of video data to identify pixels that correspond to the device. In the example depicted in FIG. 1A, the application server 120 processes video data collected by the AR device 120 to identify the presence of the device 134 in one or more frames of the video data. In this example, the application server 120 can use the optical recognition techniques to determine when the device 134 is within a field of view of a camera of the device 134.

The process 600 can include the operation of obtaining a network status for the device (630). For example, the application server 120 can obtain network connectivity data of the device 134 that is collected by the monitor control unit 110 and/or the application server 120. The network connectivity can be collected periodically at specified time periods, e.g., every three seconds, or alternatively, in real-time. In the example depicted in FIG. 1A, the network status of the device 132 identifies a network signal strength of the device 132. In some implementations, the network status can identify device and/or network information, e.g., an IP address, a MAC address, and/or other types of sensed information for the device 132.

The process 600 can include the operation of generating one or more visualizations representing the network status for the device (640). For example, the application server 120 can generate one or more visualizations representing the network status for the device 132. In the example depicted in FIG. 1, the visualization 106B represents the network status, e.g., the measured network signal strength, for the device 132.

As discussed above, the application server 120 can generate different visualizations to display different network connectivity statuses. In the example depicted in FIG. 1, the application server 120 generates visualization 106A to represent the network signal strength measured for the device 132 and visualization 106B to represent the network signal strength measured for the device 134. In this example, the visualizations 106A and 106B have different colors to represent the different network signal strengths, e.g., "14%," "75%." In other instances, the application server 120 can generate different visualizations to display different network connectivity statuses that are measured for the same device, e.g., when the device is placed in different physical locations of a property. In the example depicted in FIG. 5, the application server 120 generates the visualizations 506A and 506B to represent network statuses measured for the device 502 at different locations within the property 510.

In some implementations, the application server 120 can compare the measured network signal strength to a predetermined threshold, e.g., 80% network signal strength. In such implementations, the application server 120 can generate different visualizations, e.g., visualizations with different colors, for devices that are detected to have a measured network signal strength that satisfy the predetermined threshold and for devices that are detected to have a measured network signal strength that does not satisfy the predetermined threshold. For example, the application server 120 can generate a dark visualization for a device that has a measured network signal strength that satisfies the threshold, and a light visualization for another device that has a measured network signal strength that does not satisfy the threshold.

The process 600 can include the operation of providing the one or more visualizations for display to the user (650). For example, the application server 120 provides the visualization 106A for display by the AR device 120. In this example, the visualization 106A is inserted into the visual interface 104A that is presented to the user through a projection. In other examples, visualizations can be inserted into a visual interface that is presented to the user on a screen of a device. In such examples, the AR device 120 can be, for instance, a smartphone that is used to insert the visualizations onto a video feed of the smartphone's camera.

In some implementations, the application server 120 inserts a visualization generated for a device within a specified location of a visual interface that corresponds to a location of the device. For instance, in the example depicted in FIG. 3, the application server 120 inserts the visualization 306A in a specified location of the visual interface 302B that corresponds to the location 304 of the device 132. In some instances, the application server 120 can use optical recognition techniques to identify pixels within the visual interface 302 that are occupied by the device 132. The application server 120 uses the occupied pixels to identify a location of the device 132 within the visual interface 302A and then inserts the visualizations into the visual interface so that at least some of the pixels occupied inserted visualization within the 302B correspond to pixels occupied by the device 132 within the visual interface 302B.

In some implementations, the application server 120 may provide the visualizations based on obtaining additional information regarding a field of view of the AR device 120 and using that additional information to provide visualizations. For example, the application server 120 may receive one or more of positional information from the AR device 120 that indicates the geographical position, global positioning satellite (GPS) coordinates, of the AR device 120 within a house, magnetic field information that indicates the direction, e.g., North, South, Southwest, etc., that the AR device 120 is facing and use that information to insert a visualization between the locations of the two devices.

As discussed above, the visual interface can be presented to the user using different techniques and different types of AR devices. In some implementations, the AR device 120 is a smartphone that provides a visual interface to the user on a screen of the smartphone. In such implementations, a video feed captured the smartphone's camera is presented on the visual interface such that visualizations can be provided to the user on the smartphone's screen. In other implementations, such as the example depicted in FIG. 1A, the AR device 120 is a head-mounted device that includes a lens that projects light to present a visual interface as a projection that is perceived by the user. In such implementations, visualizations can be inserted into a visual interface in a similar manner as discussed above.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed application-specific integrated circuits (ASICs).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:
1. A method comprising:
obtaining video data collected by an augmented reality device;
receiving an input from a user that specifies device information of a device of a property;
storing the device information of the device of the property in association with optical attributes of the device of the property,
identifying the device of the property based on determining that an appearance of the device of the property in the video data matches the optical attributes of the device of the property;
in response to identifying the device of the property, based on identifying the device information stored in association with the optical attributes of the device of the property and from a monitor control unit that is both different from the augmented reality device and is in communication with the device of the property, obtaining a network status for the communication between the device and the monitor control unit;

generating one or more visualizations representing the network status for the device of the property in relation to the monitor control unit; and providing the one or more visualizations for display to a user by the augmented reality device.

2. The method of claim 1, further comprising:

identifying a first device and a second device of the property based on the video data; and obtaining a first network status for the first device, and a second network status for the second device.

3. The method of claim 2, wherein:

the first network status corresponds to a detected network signal strength that satisfies a predetermined threshold, and a second network status corresponds to a detected network signal strength that does not satisfy a predetermined threshold.

4. The method of claim 3, wherein the predetermined threshold specifies an 80% network signal strength for a wireless local area network within the property.

5. The method of claim 3, wherein:

generating the one or more visualizations comprises:
　generating a first visualization representing the first network status, and
　generating a second visualization representing the second network status; and a display of the first visualization provided to the user has a different appearance than a display of the second visualization provided to the user.

6. The method of claim 5, wherein providing the one or more visualizations for output comprises:

providing a display of the first visualization in a first location within a field of view associated with the video data, the first location corresponding to a location of the first device within the field of view, and providing a display of the second visualization in a second location within the field of view, the second location corresponding to a location of the second device within the field of view.

7. The method of claim 1, wherein:

providing the one or more visualizations for display to a user by the augmented reality device comprises inserting the one or more visualizations into a visual interface presented to a user; and the visual interface is presented to the user using a light projected onto a lens of the augmented reality device.

8. The method of claim 1, wherein:

providing the one or more visualizations for display to a user by the augmented reality device comprises inserting the one or more visualizations into a visual interface presented to a user; and the visual interface is presented to the user on a screen of the augmented reality device.

9. The method of claim 1, wherein the network status for the device is monitored in real-time by a processing device located within the property.

10. The method of claim 1, wherein:

the video data identifies a field of view of a camera of the augmented reality device; and identifying the device of the property comprises determining pixels within the field of view that are occupied by the device; and providing the one or more visualizations for display to the user comprises inserting a first visualization into the field of view such that one or more pixels within the field of view that are occupied by the first visualization correspond to one or more pixels within the field of view that are occupied by the device.

11. The method of claim 1, wherein in response to identifying the device of the property, based on identifying the device information stored in association with the optical attributes of the device of the property and from a monitor control unit that is both different from the augmented reality device and is in communication with the device, obtaining a network status for the communicaton between the device of the property and the monitor control unit comprises:

obtaining, by a server and from the monitor control unit, an indication of a signal strength between the monitor control unit and the device of the property; and wherein providing the one or more visualizations for display to a user by the augmented reality device comprises:

providing, by the server, the one or more visualizations to the augmented reality device.

12. A system comprising:

one or more computers; and one or more storage devices storing instructions that, when executed by the one or more computers, cause the one or more computers to perform operations comprising:

obtaining video data collected by an augmented reality device;

receiving an input from a user that specifies device information of a device of a property;

storing the device information of the device of the property in association with optical attributes of the device of the property, identifying the device of the property based on determining that an appearance of the device of the property in the video data matches the optical attributes of the device fo the property;

in response to identifying the device of the property, based on identifying the device information stored in association with the optical attributes of the device of the property and from a monitor control unit that is both different from the augmented reality device and is in communication with the device of the property, obtaining a network status for the communication between the device of the property and the monitor control unit;

generating one or more visualizations representing the network status for the device fo the property in relation to the monitor control unit; and providing the one or more visualizations for display to a user by the augmented reality device.

13. The system of claim 12, wherein the operations further comprise:

identifying a first device and a second device of the property based on the video data; and obtaining a first network status for the first device, and a second network status for the second device.

14. The system of claim 13, wherein:

the first network status corresponds to a detected network signal strength that satisfies a predetermined threshold, and a second network status corresponds to a detected network signal strength that does not satisfy a predetermined threshold.

15. The system of claim 14, wherein the predetermined threshold specifies an 80% network signal strength for a wireless local area network within the property.

16. The system of claim 14, wherein:
generating the one or more visualizations comprises:
generating a first visualization representing the first network status, and generating a second visualization representing the second network status; and
a display of the first visualization provided to the user has a different appearance than a display of the second visualization provided to the user.

17. A non-transitory computer-readable storage device encoded with computer program instructions that, when executed by one or more computers, cause the one or more computers to perform operations comprising:
obtaining video data collected by an augmented reality device;
receiving an input from a user that specifies device information of a device of a property;
storing the device information of the device of the property in association with optical attributes of the device of the property,
identifying the device of the property based on determining that an appearance of the device of the property in the video data matches the optical attributes of the device of the property;
in response to identifying the device of the property, based on identifying the device information stored in association with the optical attributes of the device of the property and from a monitor control unit that is both different from the augmented reality device and is in communication with the device of the property, obtaining a network status for the communication between the device of the property and the monitor control unit;
generating one or more visualizations representing the network status for the device of the property in relation to the monitor control unit; and
providing the one or more visualizations for display to a user by the augmented reality device.

18. The device of claim 17, wherein the operations further comprise:
identifying a first device and a second device of the property based on the video data; and
obtaining a first network status for the first device, and a second network status for the second device.

19. The device of claim 18, wherein:
the first network status corresponds to a detected network signal strength that satisfies a predetermined threshold, and
a second network status corresponds to a detected network signal strength that does not satisfy a predetermined threshold.

* * * * *

UNITED STATES PATENT AND TRADEMARK OFFICE
CERTIFICATE OF CORRECTION

PATENT NO. : 10,666,768 B1
APPLICATION NO. : 15/708311
DATED : May 26, 2020
INVENTOR(S) : Kyle Rankin Johnson It is certified that error appears in the above-identified patent and that said Letters Patent is hereby corrected as shown below:

In the Claims

In Column 21, Claim 1, Line 4, after "device" insert -- of the property --.

In Column 22, Claim 11, Line 14 (approx.), delete "communicaton" and insert -- communication --, therefor.

In Column 22, Claim 12, Line 41, delete "fo" and insert -- of --, therefor.

In Column 22, Claim 12, Line 51, delete "fo" and insert -- of --, therefor.

Signed and Sealed this
Fourteenth Day of July, 2020

Andrei Iancu
*Director of the United States Patent and Trademark Office*